(12) United States Patent
Dake et al.

(10) Patent No.: US 6,959,380 B2
(45) Date of Patent: Oct. 25, 2005

(54) SEAMLESS COMPUTER SYSTEM REMOTE CONTROL

(75) Inventors: Gregory William Dake, Durham, NC (US); Benjamin Russell Grimes, Zebulon, NC (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 09/804,875

(22) Filed: Mar. 13, 2001

(65) Prior Publication Data

US 2002/0133580 A1 Sep. 19, 2002

(51) Int. Cl.[7] .................................................. G06F 9/00
(52) U.S. Cl. ............................... 713/2; 713/1; 709/709; 709/220; 709/221; 709/222
(58) Field of Search ................................ 709/217–219, 709/220–222, 223; 714/36; 713/1, 2; 710/302, 710/304

(56) References Cited

U.S. PATENT DOCUMENTS

| | | | |
|---|---|---|---|
| 6,438,575 B1 * | 8/2002 | Khan et al. .................. | 709/200 |
| 6,560,641 B1 * | 5/2003 | Powderly et al. ............ | 709/219 |
| 6,714,536 B1 * | 3/2004 | Dowling ...................... | 370/356 |
| 6,732,067 B1 * | 5/2004 | Powderly ...................... | 703/24 |
| 2003/0163765 A1 * | 8/2003 | Eckardt et al. ............... | 714/36 |

* cited by examiner

Primary Examiner—John Follansbee
Assistant Examiner—M. A Siddiqi
(74) Attorney, Agent, or Firm—Martin J. McKinley; Dillon & Yudell LLP

(57) ABSTRACT

A remote control application is loaded and executes on a service processor independent from a main processor within a remotely managed system, prior to power on for the main processor. The remote control application grabs and packetizes video data from the remotely managed system for transmission to the remote console via a TCP/IP connection transport layer, and receives keyboard/mouse signals in the same manner for insertion into the remotely managed systems's keyboard/mouse controller(s) as though originating from locally attached peripherals. The service processor also feeds up a Java applet for displaying the video data and capturing keyboard/mouse actions through a browser at the remote console. Remote control is thus enabled from power up of the main processor continuously through operating system load by the main processor with a single user interface, a single connection, and no special utility requirements at the remote console.

18 Claims, 3 Drawing Sheets

SEAMLESS COMPUTER SYSTEM REMOTE CONTROL

BACKGROUND OF THE INVENTION

1. Technical Field

The present invention generally relates to remotely controlling data processing systems and in particular to employing a service processor within a remotely managed data processing system for remote control. Still more particularly, the present invention relates to employing a service processor to intercept video output and force mouse/keyboard input to a main processor through a connection to a remote console.

2. Description of the Related Art

With current computer systems, a desire exists to remotely manage one or more systems utilizing standard interconnections—such as a local area network ("LAN") serial connection—and a remote console at which full keyboard and mouse control may be initiated to manipulate the remotely managed systems. Current designs and applications available for this purpose are varied in their abilities and in the areas which they can control. On some systems, the ability to remotely watch and control a managed system during the period of time between when the managed system is powered on until the operating system (OS) begins loading exists only through the use of video and keyboard interrupts for re-direction to a serial port. Additionally, applications such as PC Anywhere or Netfinity Director utilize the Distributed Command Architecture Framework (DCAF) to allow for remote console take-over of managed systems once the operating system is loaded and operational.

Even when combined, however, these two solutions are lacking in several areas. First, in order to remotely manage the system at any time during the system life, from the time of power on until the operating system is up and running and thereafter, the remote manager is required to initiate one set of protocols or functions during the Post On Self Test (POST) timeframe, then disconnect and re-establish the connection with the remote console once the operating system has loaded. This forces a drop of connection and a separate initiation for extended control.

Second, there remains a window in time—from the point at which the system is powered on until the operating system is up and running—during which the managed system cannot be remotely controlled. As illustrated in the system time line of FIG. 4, there exists a period of time between the end of the POST Console redirection and the point in time at which the operating system is up and running during which the operating system is loading its kernel and associated device drivers. During this period, when no remote monitoring or control is available under the combination of existing solutions described above, a large number of operating system errors occur. If a critical error occurs during this time period, the remote manager cannot get into the system to view the failing situation because the remote console is switching between remote management applications (i.e., the POST redirection utility has shut down and the remote console application has not yet started).

Third, the current designs require that the remote console include one set of utilities running on the native operating system of the remote console which understand how to communicate with the POST redirection code as well as a second set of utilities which understand how to communicate with the remote console (RC) application. In general, there exists no unified mechanism for a terminal operator to seamlessly—with one application—have full remote control over the managed system from power on until shut down.

Lastly, there exists a requirement that the management applications which currently utilize remote control exists as a specific set of utilities resident on the remote console. Given that problems may occur with a system at anytime, the ability to remotely control a managed system from anyplace requires the managing individual to have a console with them at all times, with the appropriate software running. In order to allow the managing individual to move from system to system, the remote console should be operable without unique software running on the console.

It would be desirable, therefore, to allow a single connection to be established with a remotely managed system to control that system from power on through operating system load, with a single user interface for remote management throughout this period and without requiring unique management software at the remote console.

SUMMARY OF THE INVENTION

It is therefore one object of the present invention to provide improved remote control over data processing systems.

It is another object of the present invention to employ a service processor within a remotely managed data processing system for remote control.

It is yet another object of the present invention to provide a mechanism for employing a service processor to intercept video output and force mouse/keyboard input to a main processor through a connection to a remote console.

The foregoing objects are achieved as is now described. A remote control application is loaded and executes on a service processor independent from a main processor within a remotely managed system, prior to power on for the main processor. The remote control application grabs and packetizes video data from the remotely managed system for transmission to the remote console via a TCP/IP connection transport layer, and receives keyboard/mouse signals in the same manner for insertion into the remotely managed systems's keyboard/mouse controller(s) as though originating from locally attached peripherals. The service processor also feeds up a Java applet for displaying the video data and capturing keyboard/mouse actions through a browser at the remote console. Remote control is thus enabled from power up of the main processor continuously through operating system load by the main processor with a single user interface, a single connection, and no special utility requirements at the remote console.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
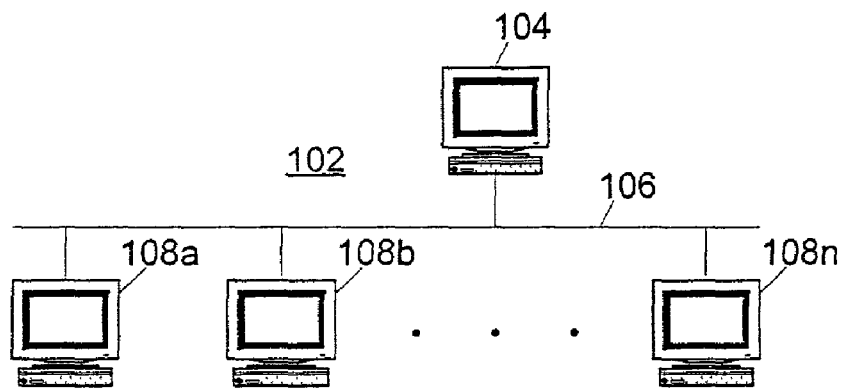
FIG. 1 depicts a data processing system network enabling remote control of selected managed systems in accordance with a preferred embodiment of the present invention.

With reference now to the figures, and in particular with reference to FIG. 1, a data processing system network enabling remote control of selected managed systems in accordance with a preferred embodiment of the present invention is depicted. Data processing system network 102 includes a remote console system 104 coupled via a network 106 to one or more remotely managed systems 108a–108n. Remote console system 104 need not be different in construction and operation from remotely managed systems 108a–108n, but may instead simply be one of a number of interconnected systems, all subject to remote control, which is currently executing a remote console application.

The structure and operation of data processing systems 104 and 108a–108n, as well as of network 106, is well-known in the art, and only so much of that construction and operation which is unique to the present invention and/or necessary for an understanding of the present invention is described herein.

Figure 2:
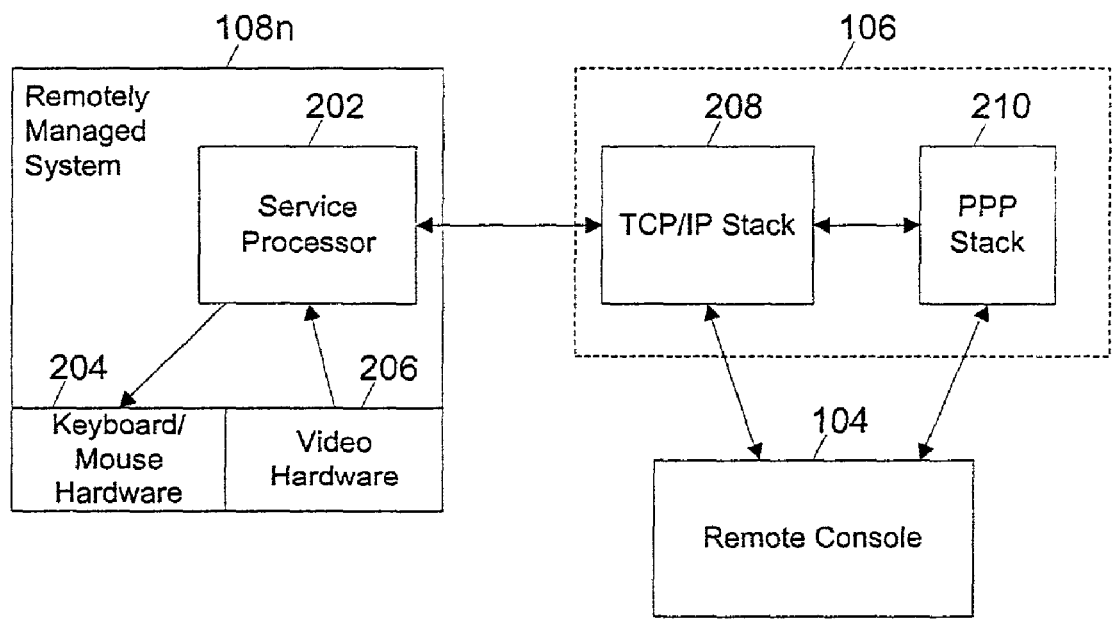
FIG. 2 is a block diagram of a remote control system in accordance with a preferred embodiment of the present invention.

Referring to FIG. 2, a block diagram of a remote control system in accordance with a preferred embodiment of the present invention is illustrated. The present invention solves the problem of remote control by taking advantage of a service processor 202, independent of the main processor (not shown), within the remotely managed system 108n. In contemporary designs, service processors are being incorporated into various types of data processing systems, from high-end servers to set top boxes, for a variety of other purposes. Given a system with an independent service processor 202, the firmware of the service processor 202 is capable of gaining control of the managed hardware and acting as a conduit for the remote control application to a management console. In the present invention, service processor 202 serves four distinct functions:

First, the service processor 202 has control over the keyboard/mouse controller(s) 204 within the remotely managed system 108n. The service processor 202 has the ability to receive keyboard and mouse data remotely, and to force that data into the system keyboard/mouse controller(s) 204 to create the appearance, to the remotely managed system 108n, that the remotely managed system 108n received real keyboard and mouse data from locally attached peripherals.

Second, the service processor 202 must have the ability to get video data out of the video hardware 206 within the remotely managed system 108n. This function may be performed in several known ways, including video snooping of the actual video hardware or video redirection via device drivers or firmware.

Third, the service processor 202 should be able to communicate with a remote console 104 via an industry standard communication packet. In the preferred embodiment Transmission Control Protocol/Internet Protocol (TCP/IP) is employed to allow a generic Web browser to be employed at the remote console 104 in controlling remotely managed system 108n. As a result, no unique set of software executing on the remote console 104 is required to control remotely managed system 108n. Network 106 thus includes operation through a TCP/IP stack 208 and a Point-to-Point Protocol (PPP) stack 210.

Lastly, the service processor 202 should, in the preferred embodiment, be capable of serving up a Java applet to the Web browser running within the remote console system 104. The Java applet should receive video data from the remotely managed system 108n and display that video data on the screen at the remote console 104, and capture keyboard and mouse inputs from the remote console system 104 for redirection to the remotely managed system 108n. The Java application may employ push technology for the video from the remotely managed system 108n up to the remote console 104 as well as pull technology of the keyboard and mouse inputs from the remote console 104 down to the remotely managed system 108n.

Given the environment depicted and described above, the service processor 202 is able to accommodate the requirements for remote control from power on through operating system load as outlined above. A remote control power on request is initiated from the service processor 202, when, for example, power is turned on at the remotely managed system 108n. The service processor 202 first loads the remote control application which allows the service processor 202 to receive and manage remote control information (e.g., intercept video data and direct keyboard/mouse signals), then serves up the remote console Java applet to the Web browser within the remote console 104. The service processor 202 will then reset or power on the remainder of the remotely managed system 108n.

Once POST is started during power on of the main processor within the remotely managed system 108n, the remote control application executing in the service processor 202 will begin grabbing the video information from the host, packetizing that video information, and transmitting the packetized video information through the TCP/IP transport layers to the remote console 104. The java applet running in the Web browser on the remote console 104 will remove the video data from the packet(s) and build video screens on the display terminal for the remote console 104. The reverse course is concurrently maintained for keyboard/mouse control, with the remote console 104 packetizing the keyboard and mouse data which is sent back to the service processor 104 over the TCP/IP link, where the service processor 104 stuffs the keyboard and mouse data back into the hardware controller(s) within the remotely managed system 108n.

Figure 3:
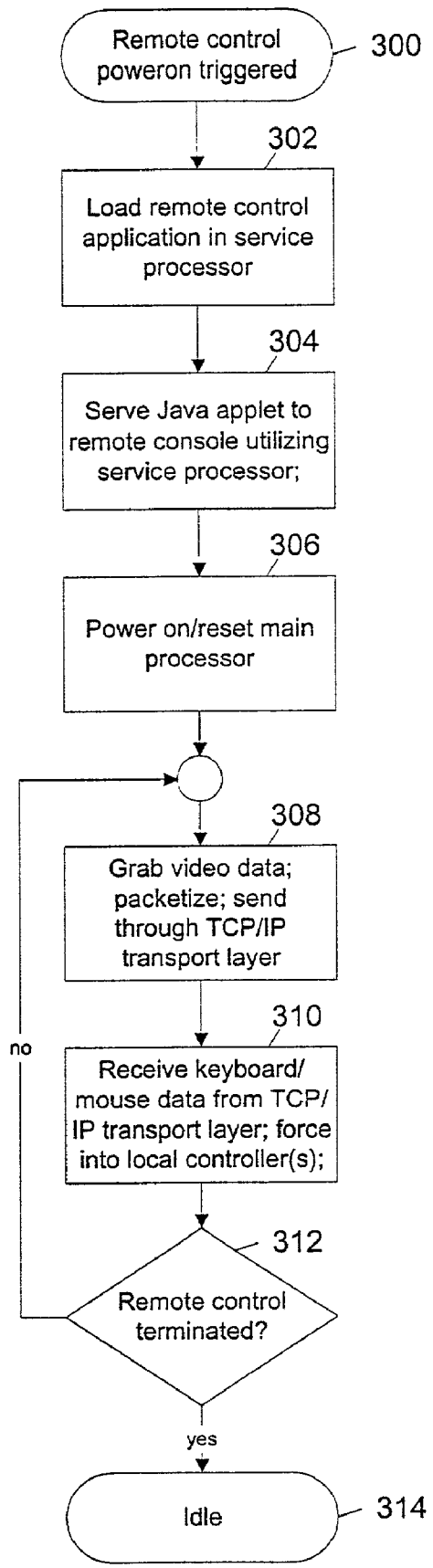
FIG. 3 is a high level flowchart for a process of remotely controlling a data processing system in accordance with a preferred embodiment of the present invention.
Figure 4:
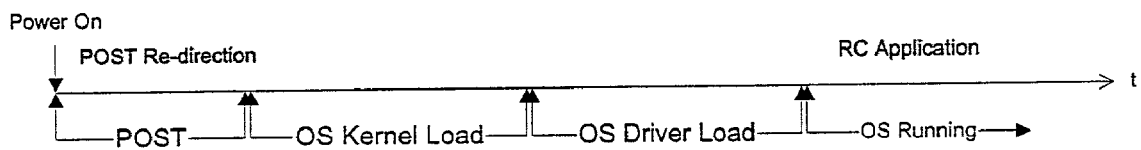
FIG. 4 is a system time line illustrating a combination of existing remote control methods.

With reference now to FIG. 3, a high level flowchart for a process of remotely controlling a data processing system in accordance with a preferred embodiment of the present invention is depicted. The process begins at step 300, which depicts the service processor within a remotely managed system receiving a remote control power on request, originating either with the remotely managed system being turned on or from a remote console desiring to initiate remote control. The process first passes to step 302, which illustrates loading the remote control application for execution by the service processor, and then to step 304, which illustrates the service processor serving a Java applet for the remote control user interface to the remote console utilizing a TCP/IP connection.

The process next passes to step 306, which depicts the service processor powering on or resetting the main processor within the remotely managed system. The process then passes to step 308, which illustrates grabbing the video data for the remotely managed system and packetizing that video data for transmission over the TCP/IP connection, all utilizing the service processor. It should be noted that the video may be acquired at regular intervals any time during the period following initiation of the POST routine, including the time during which the operating system kernel and drivers are being loaded. The process passes next to step 310, which depicts receiving packetized keyboard/mouse signals over the TCP/IP connection and, utilizing the service processor, forcing the received keyboard/mouse signals into the keyboard/mouse hardware controller within the remotely managed system. Again, it should be noted that the keyboard/mouse signals may be redirected through the local controller(s) any time during the period following initiation of the POST routine, including the time during which the operating system kernel and drivers are being loaded.

The Java applet served by the service processor to the remote console provides a user interface displaying the video data from the remotely managed system, and intercepts keyboard and mouse actions for packetizing and transmission to the service processor. In effect, the Java applet duplicates the video terminal and the keyboard/mouse ports at the remote console.

The process next passes to step 312, which illustrates a determination of whether remote control of the remotely managed system has been terminated. If not, the processor returns to and repeats steps 308 and 310, continually sending video data from the remotely managed system to the remote console and inserting keyboard/mouse signals received from the remote console into the keyboard/mouse controller(s) for the remotely managed system. Once remote control is terminated, the process passes to step 314, which illustrates the process becoming idle until remote control is again initiated for the remotely managed system.

The present invention provides a remote control capability which is independent of the operating system within the remotely managed system and allows for total remote control, from power up of the remotely managed system through loading of the operating system within the remotely managed system, and while that operating system is running. Additionally, the present invention provides a mechanism which allows the service processor to feed up the requisite remote management application to a standard Web browser utilizing standard communications protocols, allowing the remote console operator to be located essentially anywhere with any system running a standard Web browser and a connection to the remotely managed system, without requiring a special remote control application or utility.

The present invention solves the problems left by the combination of existing remote control solutions described above, and allows for a single connection to be established with the remotely managed system in order to control the system from power on through operating system load, and while the operating system is running. The present invention also provides a single user interface for remote management through the time cycle of the remotely managed system from power on through operating system load and beyond, and enables the requisite management application to be served up to the remote console from the remotely managed system, not requiring a unique piece of management software at the remote console.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of remote control of a remotely managed data processing system including the service processor and a separate main processor, said method comprising:
   prior to initiation of execution of power-on self-test (POST) code by a main processor of a remotely managed data processing system:
      on a service processor separate from the main processor, initiating execution of a remote control application; and
      the remote control application establishing communication over a network connection with a remote console;
   thereafter, initiating execution of POST code by the main processor; and
   the remote control application enabling remote control of the remotely managed data processing system upon initiation of execution of said POST code, said enabling remote control including:
      getting video data from video hardware within the remotely managed data processing system;
      transmitting the video data to the remote console over the network connection;
      receiving keyboard/mouse signals from the remote console over the network connection; and
      forcing the received keyboard/mouse signals into a keyboard/mouse controller within the remotely managed data processing system as if the received keyboard/mouse signals had originated with locally attached peripherals.

2. The method of claim 1, wherein establishing communication further comprises:
   the remote control application communicating with the remote console utilizing a TCP/IP network connection.

3. The method of claim 1, wherein establishing communication further comprises:
   the remote control application serving to the remote console a Java applet fix displaying the video data and capturing the keyboard/mouse signals, wherein the remotely managed system may be remotely controlled utilizing a browser executing within the remote console.

4. The method of claim 1, wherein initiating execution of the remote control application further comprises:
   executing the remote control application independently of the operating system executed on the main processor within the remotely managed system.

5. The method of claim 1, wherein enabling remote control further comprises:
   enabling remote control capability to the remote console from power on self test of the main processor continuously through operating system load for the main processor and beyond.

6. The method of claim 1, and further comprising:
   the remote control application providing a single user interface for remote control by the remote console from power on self test of the main processor continuously through operating system load for the main processor and beyond.

7. A remotely managed data processing system permitting remote control from a remote console, said remotely managed data processing system comprising:
a main processor;
a service processor separate from the main processor; and
data storage including a remote control application executable by said service processor;
wherein said service processor, prior to initiation of execution of power-on self-test (POST) code by a main processor of a remotely managed data processing system, initiates execution of the remote control application and establishes communication over a network connection with the remote console; and
wherein the remote control application, upon initiation of execution of POST code by the main processor, enables remote control of the remotely managed data processing system from the remote console by:
getting video data from video hardware within the remotely managed data processing system;
transmitting the video data to the remote console over the network connection;
receiving keyboard/mouse signals from the remote console over the network connection; and
forcing the received keyboard/mouse signals into a keyboard/mouse controller within the remotely managed data processing system as if the received keyboard/mouse signals had originated with locally attached peripherals.

8. The system of claim 7, wherein the remote control application communicates with the remote console utilizing a TCP/IP network connection.

9. The system of claim 7, wherein the remote control application serves to the remote console a Java applet for displaying the video data and capturing the keyboard/mouse signals, wherein the remotely managed system may be remotely controlled utilizing a browser executing within the remote console.

10. The system of claim 7, wherein the remote control application executes independently of the operating system executed on the main processor within the remotely managed system.

11. The system of claim 7, wherein the remote control application executing on the service processor provides remote control capability to the remote console from power on self test for the main processor continuously through operating system load for the main processor and beyond.

12. The system of claim 7, wherein the remote control application executing on the service processor provides a single user interface for remote control by the remote console from power on self test for the main processor continuously through operating system load for the main processor and beyond.

13. A computer program product within a computer usable medium for remote control of a remotely managed data processing system from a remote console, said computer program product comprising a computer usable medium and a remote control application executable on a service processor of the remotely managed system separate from a main processor within the remotely managed data processing system, wherein, when executed by the service processor, the remote control application:
prior to initiation of execution of power-on self-test (POST) code by a main processor of a remotely managed data processing system, executes to establish communication over a network connection with a remote console;
from initiation of execution of POST code by the main processor enables remote control of the remotely managed data processing system by;
getting video data from video hardware within the remotely managed data processing system;
transmitting the video data to a remote console over a network connection coupling the remotely controlled system to the remote console;
receiving keyboard/mouse signals from the remote console over the network connection; and
forcing the received keyboard/mouse signals into a keyboard/mouse controller within the remotely managed data processing system as if the received keyboard/mouse signals had originated with locally attached peripherals.

14. The computer program product of claim 13, wherein the remote control application further comprises:
instructions for communicating with the remote console utilizing a TCP/IP network connection.

15. The computer program product of claim 13, wherein the remote control application further comprises:
instructions for serving to the remote console a Java applet for displaying the video data and capturing the keyboard/mouse signals, wherein the remotely managed system may be remotely controlled utilizing a browser executing within the remote console.

16. The computer program product of claim 13, wherein the remote control application executes independently of the operating system executed on the main processor within the remotely managed system.

17. The computer program product of claim 13, wherein the remote control application provides remote control capability to the remote console from power on self test for the main processor continuously through operating system load for the main processor and beyond.

18. The computer program product of claim 13, wherein the remote control application provides a single user interface for remote control byte remote console from power on self test for the main processor continuously through operating system load for the main processor and beyond.

* * * * *

UNITED STATES PATENT AND TRADEMARK OFFICE
CERTIFICATE OF CORRECTION

PATENT NO. : 6,959,380 B2  Page 1 of 1
APPLICATION NO. : 09/804875
DATED : October 25, 2005
INVENTOR(S) : Gregory W. Dake et al.

It is certified that error appears in the above-identified patent and that said Letters Patent is hereby corrected as shown below:

Column 6, line 49, delete "fix" and insert --for--.

Signed and Sealed this

Eighth Day of August, 2006

JON W. DUDAS
*Director of the United States Patent and Trademark Office*